United States Patent [19]

Frost

[11] Patent Number: 5,113,986
[45] Date of Patent: May 19, 1992

[54] STRUT-TYPE SYNCHRONIZER MECHANISM WITH RETRACTING AND CENTERING STRUT

[75] Inventor: Barry L. Frost, Dewitt, N.Y.

[73] Assignee: New Venture Gear, Inc., Troy, Mich.

[21] Appl. No.: 682,604

[22] Filed: Apr. 9, 1991

[51] Int. Cl.$^5$ ............................................. F16D 23/06
[52] U.S. Cl. .................................... 192/53 F; 74/339
[58] Field of Search ................ 192/53 F, 53 E, 53 G, 192/53 C; 74/339

[56] References Cited

U.S. PATENT DOCUMENTS

| | | | |
|---|---|---|---|
| 2,221,893 | 11/1940 | White | 192/53 F |
| 4,566,568 | 1/1986 | Yant | 192/53 F |
| 4,869,353 | 9/1989 | Ohtsuki et al. | 192/53 F |

FOREIGN PATENT DOCUMENTS

| | | | |
|---|---|---|---|
| 1077989 | 3/1960 | Fed. Rep. of Germany | 74/339 |
| 1094051 | 12/1960 | Fed. Rep. of Germany | 192/53 F |
| 1555158 | 1/1971 | Fed. Rep. of Germany | 192/53 F |
| 0137627 | 8/1983 | Japan | 192/53 F |

Primary Examiner—Rodney H. Bonck
Attorney, Agent, or Firm—Harness, Dickey & Pierce

[57] ABSTRACT

The present invention is directed to a strut-type synchronizer mechanism having a spring member adapted for retracting and centering the blocker ring. The spring member is a leaf spring disposed within guide slots formed in the clutch hub and which is compressed between the blocker ring and the strut. The leaf spring includes a cambered surface for radially outwardly biasing the strut into contact with the clutch sleeve. In addition, the leaf spring has canted tab ends which rest upon a radial projection formed on the blocker ring for producing an axial retractive force on the blocker ring for driving the blocker ring toward a "neutral" position. The axial retractive force serves to overcome any residual viscous drag in the synchronizer mechanism created by residual friction remaining between the mating cone surfaces of the blocker ring and a ratio gear. The leaf spring further acts to retain the blocker ring in the neutral position against any viscous forces which may initiate self-energization of the synchronizer.

21 Claims, 3 Drawing Sheets

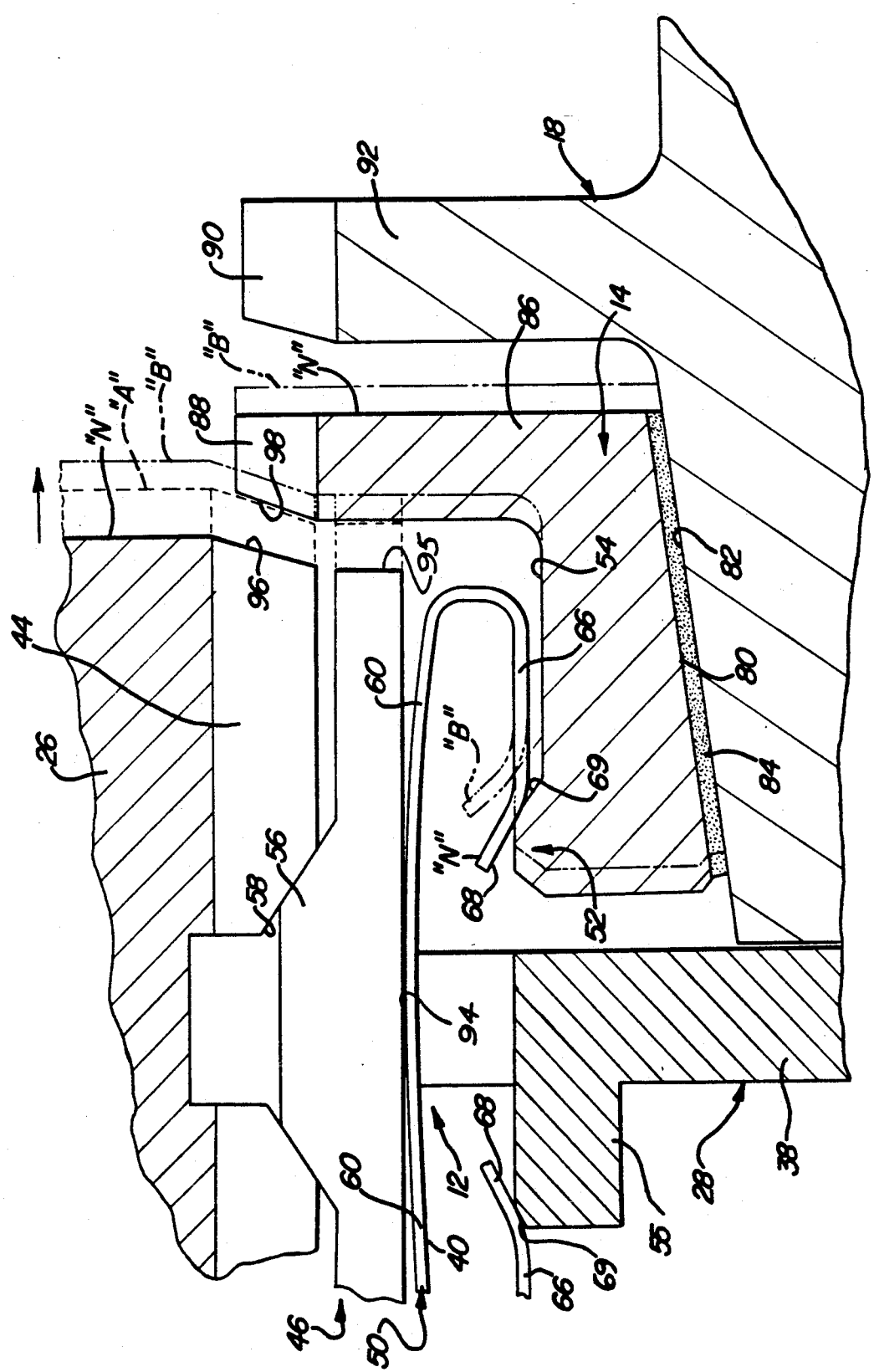

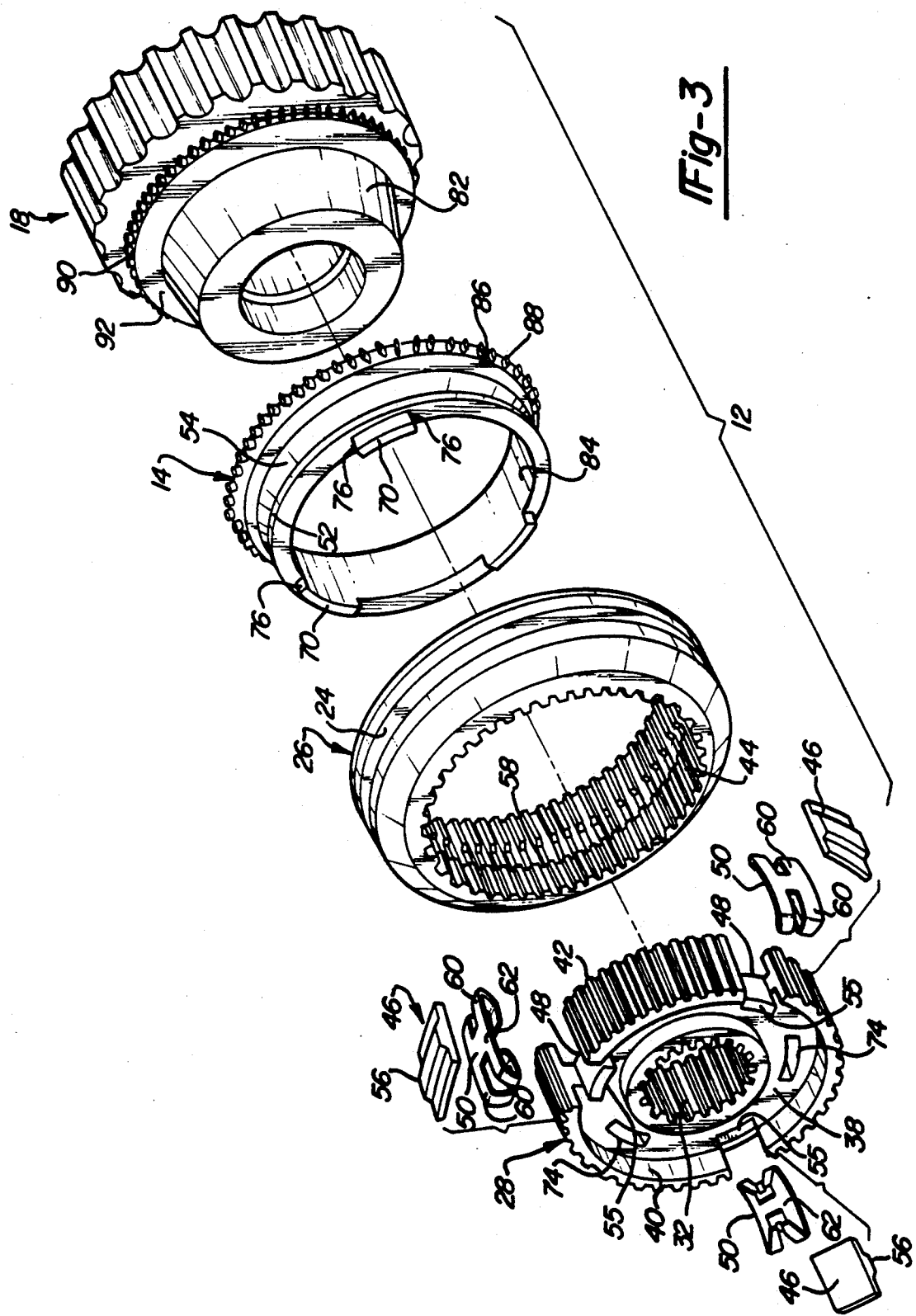

STRUT-TYPE SYNCHRONIZER MECHANISM WITH RETRACTING AND CENTERING STRUT

BACKGROUND OF THE INVENTION

The present invention relates to strut-type synchronizers for manual transmissions and, more particularly, to such a synchronizer mechanism incorporating an improved strut spring adapted for retracting and centering the blocker ring.

Strut-type synchronizers, such disclosed in U.S. Pat. No. 4,566,568 issued Jan. 28, 1986 to Yant, are used in manually operated transmission and transfer cases and generally include a plurality of spring-biased struts that are radially interposed between a driven clutch hub and a clutch sleeve. A spring member operates to radially outwardly bias the struts so as to seat the struts in a detent groove formed in the inner bore of the clutch sleeve.

As is known, axial displacement of the clutch sleeve causes the struts to act on a blocker ring for energizing the synchronizer mechanism to block further axial displacement of the clutch sleeve until speed synchronization is complete. More particularly, energization of the synchronizer mechanism causes frictional engagement between mating conical surfaces formed on the blocker ring and a ratio gear for generating sufficient torque to "clock" the blocker ring to an indexed position and rotatably drive the ratio gear. Synchronization is achieved when the relative speed between the blocker ring and ratio gear approaches zero. Thereafter, the spring member is compressed radially inwardly for allowing the clutch sleeve to pass over the struts. In this manner, internal spline teeth formed on the clutch sleeve are permitted to meshingly engage external spline teeth formed on the ratio gear for transmitting power (i.e. drive torque) from the main shaft to the ratio gear.

A primary design constraint associated with many cone-type synchronizer mechanisms is their inability to be completely "de-energized" upon disengaging the clutch sleeve from the ratio gear upon returning the synchronizer mechanism to a "neutral" position. More particularly, residual friction remaining between the mating cone surface of the ratio gear and the blocker ring may detrimentally effect the wear and life characteristics of the synchronizer mechanism. In addition, the residual viscous drag may also cause the synchronizer mechanism to "self-energize" when it is in the "neutral" position.

SUMMARY OF THE INVENTION

It is therefore an object of the present invention to provide an improved strut-type synchronizer mechanism having spring means for retracting the blocker ring toward the "neutral" position upon de-energization of the synchronizer mechanism. In a related object, the spring means act to maintain the blocker ring in the centered "neutral" position for inhibiting "self-energization" of the synchronizer mechanism.

The present invention, in its disclosed preferred embodiment, is a single-cone, strut-type, synchronizer mechanism having a friction surface formed on an internal cone surface of the blocker ring that is adapted to frictionally engage a mating cone surface formed on an external surface of the ratio gear. The spring means include a plurality of leaf springs, equally spaced around the circumference of the clutch hub, which are configured and arranged to generally surround a non-splined portion of the clutch hub axial flange. In general, the leaf springs are compressed between an underside surface of the struts and a radial projection formed on the blocker ring. The spring means act to radially bias the strut members in an outward direction for causing a stop projection formed on the strut to engage a detent groove formed in the clutch sleeve. In addition, as the synchronizer mechanism is selectively de-energized, the leaf springs impart an axially directed force on the blocker ring projection for retracting the blocker ring toward the central "neutral" position. Furthermore, with the blocker ring in the central "neutral" position, the leaf springs continue to apply an axial biasing force on the blocker ring projection for inhibiting self-energization due to any residual viscous effects of the synchronizer mechanism.

Additional objects, features, and advantages of the present invention will become apparent from a reading of the following detailed description and appended claims, taken in conjunction with the accompanying drawings.

BRIEF DESCRIPTION OF THE DRAWINGS

FIG. 2 is an enlarged fragmentary cross-sectional view of the improved synchronizer mechanism shown in FIG. 1; and FIG. 3 is an exploded perspective view of the improved synchronizer mechanism shown in FIG. 1.

DETAILED DESCRIPTION OF THE INVENTION

Figure 1:
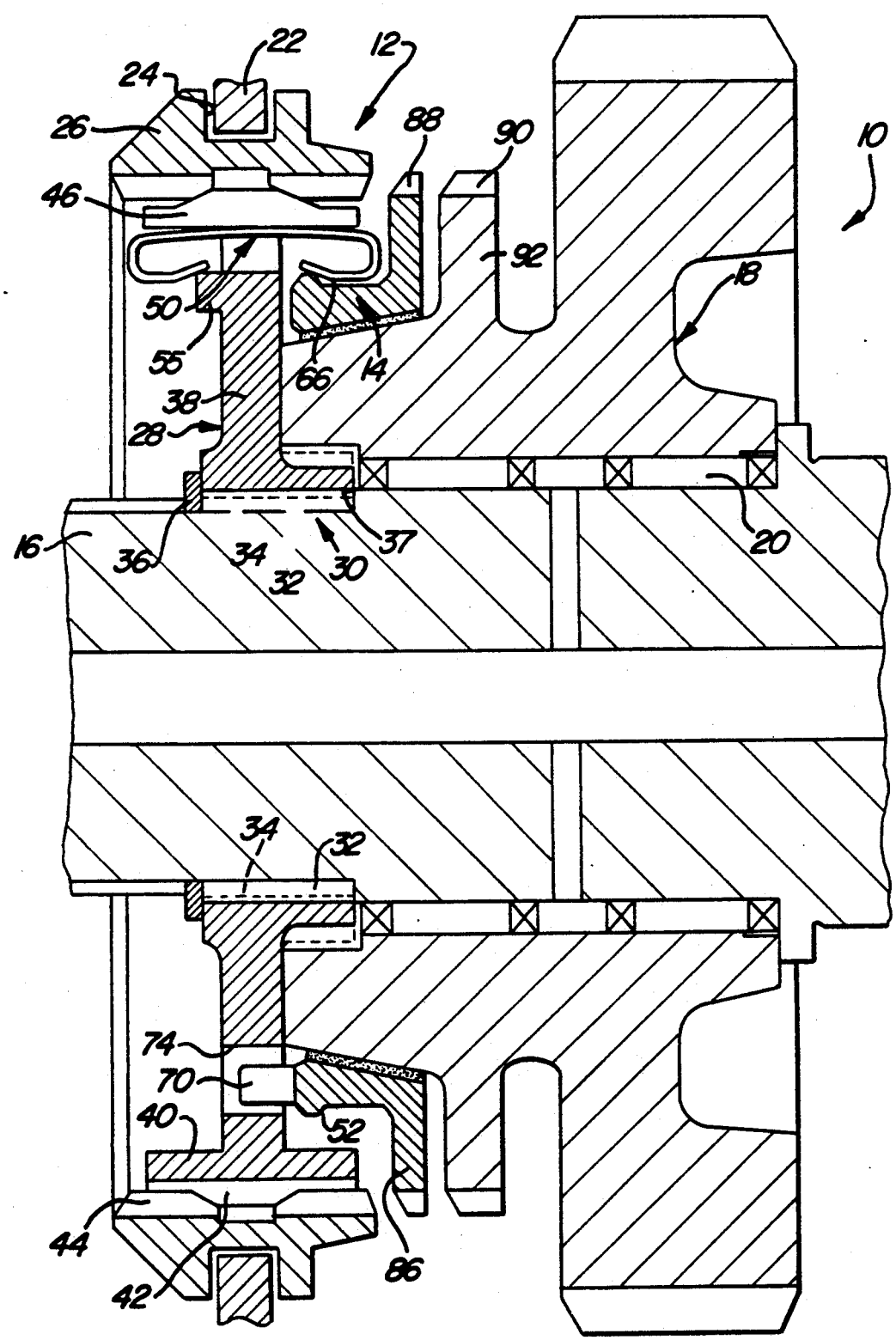
FIG. 1 is a longitudinal cross-sectional view of a portion of an exemplary motor vehicle manual transmission incorporating the improved synchronizer mechanism of the present invention.

With particular reference to the drawings, a portion of an exemplary motor vehicle transmission 10 is shown having a strut-type synchronizer mechanism 12 incorporate therein. As will be described hereinafter in greater detail, strut-type synchronizer mechanism 12 includes improved spring means for operatively retracting and centering a blocker ring 14 upon selective "de-energization" of synchronizer mechanism 12. However, it will be appreciated that while the drawings illustrate a single-cone synchronizer, the improved spring means of the present invention is readily adaptable for use with virtually any suitable strut-type synchronizer mechanism. Likewise, it is to be understood that while synchronizer mechanism 12 is shown in a uni-directional transmission application (i.e. such as in a transfer case) it can also be used in bi-directional application (i.e. such as in a manual transmission).

With particularly reference now to FIG. 1, a central power transfer shaft 16 is shown to journally support a ratio gear 18 by suitable bearing means 20. Located on one side of ratio gear 18 is synchronizer mechanism 12, which operates to synchronize the speed between power transfer shaft 16 and ratio gear 18. More specifically, synchronizer mechanism 12 is actuated (i.e. energized) by a vehicle operator selectively shifting a conventional mechanical shift fork mechanism, partially shown at 22, that is connected through a groove 24 to an axially moveable clutch sleeve 26.

Synchronizer mechanism 12 includes a clutch hub 28 that is fixed for rotation with, and positioned on power transfer shaft 16 by shaft-to-hub connection means 30 shown to include mating hub splines 32 and shaft splines 34 and a retaining snap ring 36 acting in cooperation with annular shoulder 37 formed on power transfer shaft 16. Clutch hub 28 has a generally "T-shaped" cross-section that is defined by a radially extending inner web 38 and a longitudinally extending cylindrical flange 40. External splines 42 (FIG. 3) formed on clutch hub axial flange 40 are in continuous meshing engagement with internal splines 44 formed on clutch sleeve 26, and which operate to support clutch sleeve 26 on clutch hub 28 for sliding axial movement relative thereto in response to selective movement of shift fork mechanism 22.

A plurality of struts 46 are equally spaced concentrically about clutch hub 28 and in disposed non-splined guide slots 48 which extend through clutch hub inner web 38 and axial flange 40. Struts 46 are biased radially outwardly by spring means, disclosed herein as leaf spring members 50. From the embodiment disclosed, each leaf spring member 50 is positioned in a guide slot 48 with one of its free ends adapted to engage a radial projection 52 formed on external surface 54 of blocker ring 14. The other free end of leaf spring member 50 is adapted to engage an axial flange shoulder 55 formed integral to inner web 38 of clutch hub 28. In this manner, leaf spring members 50 are resiliently biased into engagement with an underside surface of struts 46 between blocker ring 14 and clutch hub 28. In particular, leaf spring members 50 are designed to produce an outward radial force sufficient to seat stop projection of "hump" 56 on struts 46 in a detent groove 58 that is circumferentially cut in clutch sleeve internal splines 44 for permitting struts 46 to move concurrently with clutch sleeve 26 upon actuation of synchronizer mechanism 12. While flange shoulder 55 is required for supporting leaf spring members 50 in unidirectional synchronizers, it will be appreciated that in bi-directional synchronizer applications each blocker ring located on opposite sides of the clutch hub will have radial projection 52 formed thereon. As such, the present invention is readily adapted for use with virtually any strut-type synchronizer apparatus.

In accordance with the teachings of the present invention, leaf springs 50 are generally H-shaped members having first and second pairs of oppositely longitudinally extending and spaced legs 60 separated by a central stem portion 62. Legs 60 and stem 62 are slightly convexly curved (i.e. cambered) so as to contact the underside surface of strut 46 near its center. In addition, legs 60 are bent down and under themselves so as to define inwardly directed tabs 66 which are adapted to engage blocker ring radial projection 52 and clutch hub flange shoulder 55. More specifically, an angle or canted free end 68 of tabs 66 engages a cam surface 69 formed on both radial projection 52 and axial shoulder 55. Canted ends 68 are configured to coact with cam surface 69 for imparting an axially directed force on blocker ring projection 52 for assisting in retracting blocker ring 14 toward clutch hub 28 upon de-energization of synchronizer mechanism 12. More particularly, this axially directed "retracting" force causes blocker ring 14 to frictionally disengage ratio gear 18 for preventing blocker ring 14 from "self-energizing" as will be described hereinafter.

In general, the improved spring means of the present invention is adapted for use in strut-type synchronizers and, more preferably, for use in strut-type single-cone synchronizers. As best seen in FIG. 3, blocker ring 14 is provided with three axially-extending lugs 70 spaced at 120 degree intervals. Lugs 70 are adapted to be nested in apertures 74 that are cut in clutch hub inner web 38. Lugs 70 serve to couple blocker ring 14 and clutch hub 28 such that during indexing or "clocking" of blocker ring 14 its lugs 70 have one of their respective side faces 76 adapted to contact an opposed face within its associated aperture 74.

As best seen in FIG. 2, strut-type synchronizer mechanism 12 has an internal cone surface 80 formed on blocker ring 14 which is adapted to frictionally engage an external cone surface 82 formed on ratio gear 18 upon energization of synchronizer mechanism 12. In the disclosed embodiment, a friction lining or pad 84 is suitably bonded to blocker ring internal conical surface 80 for developing frictional cone-torque loading between blocker ring 14 and ratio gear 18 when synchronizer mechanism 12 is selectively energized via shifting clutch sleeve 26 toward ratio gear 18. An example of one type of suitable friction lining that may be incorporated into the present invention is provided in U.S. Pat. No. 4,267,912 issued May 29, 1981 to Bauer, et al., the disclosure of which is expressly incorporated by reference herein. Furthermore, while synchronizer 12 is shown as a single-cone apparatus, it will be appreciated that the improved centering and retracting spring means (i.e. leaf springs 50) of the present invention can be readily used with virtually any strut-type synchronizer apparatus.

Blocker ring 14 is shown to include a radial flange section 86 having external splines 88 that are alignable with external splines 90 located on a radial flange section 92 of ratio gear 18. As will be appreciated, blocker ring external splines 88 and ratio gear external splines 90 are each adapted for meshing engagement with clutch sleeve internal splines 44 such that torque from power transfer shaft 16 is transferred for driving ratio gear 18.

With particular reference now to FIG. 2, various operative positions of clutch sleeve 26, blocker ring 14, struts 46 and the corresponding positions of leaf springs 50 are shown. Specifically, synchronizer mechanism 12 is shown in a "neutral" de-energized position as indicated by construction Line "N". In this "neutral" position, power is not transferred from power transfer shaft 16 to ratio gear 18. Moreover, when synchronizer mechanism 12 is in the "neutral" position blocker ring 14 is maintained in a leftward "disengaged" position (shown in solid lines) by the axial biasing force exerted by canted ends 68 of leaf springs 50 on blocker ring projection 52. As such, leaf springs 50 provide a "centering" feature for positively locating blocker ring 14 with respect to clutch hub 28 and ratio gear 18.

As is known in the synchronizer art, when an input force is exerted by the vehicle operator during a gear change, shift fork mechanism 22 initiates axial movement of clutch sleeve 26 from its "neutral" position toward ratio gear 18. This initial axial movement of clutch sleeve 26 causes corresponding axial movement of struts 46 within clutch hub guide slots 48 such that the underside surface of struts 46 slides against a external contoured (i.e. cambered) surface 94 of leaf springs 50 until a transverse end 95 of struts 46 abuts blocker ring radial flange 86, this position being indicated by construction Line "A". Thereafter, continued movement of clutch sleeve 26 causes blocker ring 14 to overcome the axial biasing of leaf springs 50 for movement toward ratio gear 18 to a position shown by construction Line "B" so as to take-up running clearances in synchronizer mechanism 12. When these clearances are eliminated, blocker ring internal cone surface 80 frictionally engages ratio gear external cone surface 82 for developing initial frictional cone-torque loading between blocker ring 14 and ratio gear 18. This cone-torque loading acts to rotate or "clock" blocker ring 14 to an indexed position so as to force a side face 76 of each blocker ring lug 70 against an opposed face surface of its respective clutch hub aperture 74 for drawing blocker ring friction surface 80 into frictional (i.e. clamping) engagement with ratio gear cone surface 82.

With blocker ring 14 in the indexed position, clutch sleeve 26 moves to a chamfer-to-chamfer loading position (construction Line "B") between chamfers 96 and 98 on the opposed spline faces of clutch sleeve internal splines 44 and blocker ring external splines 88, respectively. At this point, continued rearward axial movement of clutch sleeve 26 is inhibited until speed synchronization is complete. In addition, canted ends 68 of leaf spring tabs 66 are resiliently deflected due to the rearwrd movement of blocker ring 14.

Once the cone torque generated by the frictional engagement is sufficient for causing the relative speed of rotation between ratio gear 18 and blocker ring 14 to approach zero, the cone torque load diminishes and synchronization is complete. More specifically, when the cone torque falls to zero, blocker ring 14 is "de-energized". A counter torque that results from the chamfer-to-chamfer loading overcomes the residual friction between blocker ring internal cone surface 80 and ratio gear external cone surface 82 to rotate blocker ring 14 from its "clocked" position so as to align the respective splines 44 and 88 of clutch sleeve 26 and blocker ring 14 to permit clutch sleeve 26 to pass through blocker ring 14. More particularly, upon synchronization, clutch sleeve 26 is adapted to overcome the radially outward biasing of cambered surface 94 of leaf springs 50 such that clutch sleeve detent groove 58 rides over strut projections 56. As clutch sleeve 26 rides over struts 46, struts 46 return to the FIG. 2 "neutral" position. Concurrently, clutch sleeve internal splines 44 pass through blocker ring external splines 88 and continues until axial movement of clutch sleeve 26 causes clutch sleeve internal splines 44 to lockingly mesh with ratio gear external splines 90.

According to the present invention, upon "de-energization" of blocker ring 14 (following completion of the speed synchronization) leaf spring members 50 are adapted to forcibly retract blocker ring 14 from the energized position (Line "B") to the disengaged "neutral" position (Line "N"). More particularly, canted ends 68 of leaf spring tabs 66 exert the forwardly directed axial force on blocker ring projection 52 to overcome any residual viscous drag or frictional loading between blocker ring friction surface 80 and ratio gear cone-surface 82. Furthermore, leaf springs 50 are adapted to generate sufficient biasing force on blocker ring 14 to inhibit "self-energization" due to residual viscous drag effects. In operation, when the vehicle operator selectively disengages ratio gear 18 during a gear change, shift fork mechanism 22 causes clutch sleeve 26 to move axially away from ratio gear 18 back toward the "neutral" position. As clutch sleeve 26 retreats, clutch sleeve internal splines 44 disengage ratio gear external splines 90 and blocker ring external splines 88. In addition, detent groove 58 of clutch sleeve 26 engages humps 56 of struts 46 for centering struts 46 in the "neutral" position within clutch sleeve 22 and relative to cambered surface 94 of leaf springs 50.

While the above detailed description describes a preferred embodiment of the present invention incorporated into a uni-directional strut-type synchronizer mechanism, it is to be understood that the present invention is susceptible to modification, variation, and alteration without deviating from the scope and fair meaning of the following claims.

What is claimed is:

1. In a synchronizer mechanism of the type comprising a longitudinally extending shaft having a clutch hub fixed thereon, said clutch hub having a radial web portion and a longitudinally extending externally splined flange portion, guide slot means formed in said radial web portion and externally splined flange portion of said clutch hub, a gear journally mounted on said shaft adjacent said clutch hub and having an externally splined surface, a clutch sleeve having an internally splined surface meshingly coupled to said clutch hub external splined surface and being axially slidable thereon in a first direction from a neutral position to a first operative position such that upon said clutch sleeve internal splined surface being moved into engagement with said gear external splines said synchronizer mechanism is operative to couple said gear for rotation with said shaft, a blocker ring having first friction surface means and defining a clearance with cooperating second friction surface means associated with said gear, a strut positioned for axial and radial movement within said guide slot means, and spring means for urging said strut into engagement with said internally splined surface of said clutch sleeve such that said strut moves into engagement with said blocker ring upon axial shifting operation of said clutch sleeve toward said gear for energizing said synchronizer mechanism so as to effect frictional engagement of said first and second friction surface means for developing frictional synchronizing torque therebetween, the improvement wherein said spring means is arranged to maintain continuous engagement with said blocker ring for continuously exerting an axially directed retracting force thereon for moving said blocker ring toward said neutral position upon de-energization of said synchronizer mechanism whereby said blocker ring friction surface means is operatively disengaged from said ratio gear friction surface means, said retracting force being operable for retaining said blocker ring in said neutral position for inhibiting self-energization of said synchronizer mechanism due to residual viscous drag between said first and second friction surfaces.

2. The synchronizer mechanism of claim 1, wherein said spring means is a leaf spring member disposed within said guide slot means below said strut, said leaf spring member having cambered surface means for radially outwardly biasing said strut into engagement with a detent groove formed in said clutch sleeve internally splined surface, and said leaf spring member having tab means extending from said cambered surface means for maintain continuous biased engagement with said blocker ring so as to continuously exert said axially directed retracting force thereon to inhibit movement of said blocker ring toward said first operative position.

3. The synchronizer mechanism of claim 2, wherein said tab means include canted surface means provided for maintaining constant biased engagement with projection means formed on said blocker ring, said canted surface means configured and arranged to continuously exert said retracting force on said blocker ring with said retracting force being of sufficient magnitude to overcome frictional loading between said blocker ring friction surface and said gear friction surface upon said synchronizer mechanism being de-energized.

4. The synchronizer mechanism of claim 3, wherein said leaf spring is a generally H-shaped member having a pair of longitudinally extending legs separated by a central stem, said legs and stem are slightly convexly curved to define said cambered surface means, said legs being bent down and under said cambered surface means to define first and second pairs of inwardly facing tabs, and wherein said canted surface means include angled ends of said first and second pairs of said tabs, said angled ends of said first pair of tabs adapted to be maintained in continuous biased contact with said projection means formed on said blocking ring, and said angled ends of said second pair of tabs adapted to be maintained in continuous contact with second projection means axially aligned with said blocking ring projection means.

5. The synchronizer mechanism of claim 4, wherein said synchronizer mechanism is a uni-directional synchronizer apparatus such that said blocker ring projection means includes a radially extending projection having a cam surface adapted to cooperatively engage said angled ends of said first pair of tabs, and wherein said second projection means define an integral flange shoulder formed on said clutch hub adjacent said guide slot means that is adapted to cooperatively engage said angled ends of said second pair of tabs.

6. The synchronizer mechanism of claim 5, wherein said uni-directional synchronizer apparatus is of the single-cone type such that said first friction surface means is an internal cone surface formed on said blocker ring and said second friction surface means is an external cone surface formed on said gear.

7. The synchronizer mechanism of claim 4, wherein said synchronizer mechanism is a bi-directional synchronizer apparatus including a second gear journally mounted on said shaft adjacent an opposite side of said clutch hub and having an externally splined surface, said clutch sleeve being axially slidable on said clutch hub in a second direction from said neutral position to a second operative position such that upon said clutch sleeve internal spline surface being moved into engagement with said second gear external splines said synchronizer mechanism is operative to couple said second gear for rotation with said shaft, a second blocker ring having third friction surface means and defining a clearance with cooperating fourth friction surface means associated with said second gear, said strut being movable into engagement with said second blocker ring upon axial shifting operation of said clutch sleeve toward said second gear for energizing said synchronizer mechanism, and wherein said angled ends of said first pair of tabs are adapted to maintain continuous biased engagement with a cam surface of a radially extending projection formed on said first blocker ring and wherein said angled ends of said second pair of tabs are adapted to maintain continuous biased engagement with a cam surface formed on a radially extending projection formed on said second blocker ring.

8. A synchronizer mechanism having an axially extending shaft with at least one ratio gear journally mounted on said shaft, a clutch hub having external splines fixed for rotation with said shaft, a clutch sleeve having internal splines meshed with said clutch hub external splines for sliding axial movement thereon from a neutral position to an operative position for engaging said ratio gear so as to couple said ratio gear for rotation with said shaft, a blocker ring having an internal conical friction surface adapted to frictionally engage an external conical surface formed on said ratio gear, and a thrust mechanism disposed between said clutch sleeve and said blocker ring for energizing said synchronizer mechanism upon axial displacement of said clutch sleeve toward said ratio gear, the improvement wherein said thrust mechanism includes:

strut means confined within slots means formed in said clutch hub for moving said blocker ring toward said ratio gear during axial shifting operation of said clutch sleeve so as to effect frictional engagement of said blocker ring conical friction surface with its associated ratio gear conical surface for generating cone torque therebetween; and spring means having first surface means for biasing said strut means radially outwardly into contact with said internal splines of said clutch sleeve, and second surface means acting directly on said blocker ring for continuously exerting an axially directed biasing retracting force on said blocker ring for biasing said blocker ring toward said neutral position upon de-energization of said synchronizer mechanism, said axially directed biasing retracting force being continuously exerted on said blocker ring for opposing axial movement of said blocker ring toward said ratio gear upon selective movement of said clutch sleeve toward said operative position and for retaining said blocker ring in said neutral position so as to inhibit self-energization of said synchronizer mechanism due to residual viscous drag between said friction surfaces.

9. The synchronizer mechanism of claim 8, wherein said spring means is a leaf spring member disposed within said slot means below said strut means, said first surface means of said leaf spring member being cambered for radially outwardly biasing said strut means into engagement with a detent groove formed in said clutch sleeve internal splines, and wherein said second surface means of said leaf spring member forming tab means extending from said cambered surface for maintaining continuous biased engagement with said blocker ring so as to constantly exert said axially directed retracting force thereon, said retracting force adapted to inhibit movement of said blocker ring toward said operative position.

10. The synchronizer mechanism of claim 9, wherein said tab means include canted surface means adapted to maintain continuous engagement with radial projection means formed on said blocker ring, said canted surface means being configured and arranged to continuously exert said retracting force on said blocker ring with said retracting force being of sufficient magnitude to overcome frictional loading between said blocker ring friction surface and said gear friction surface upon said synchronizer mechanism being de-energized.

11. The synchronizer mechanism of claim 10, wherein said leaf spring is a generally H-shaped member having a pair of longitudinally extending legs separated by a central stem, said legs and stem are slightly convexly curved to define said cambered surface means, said legs being bent down and under said cambered surface means to define first and second pairs of inwardly facing tabs, and wherein said canted surface means include angled ends of said first and second pairs of said tabs, said angled ends of said first pair of tabs adapted to maintain continuous biased engagement with said projection means formed on an external surface of said blocking ring, and said angled ends of said second pair of tabs adapted to maintain continuous biased engagement with second projection means axially aligned with said blocking ring projection means.

12. The synchronizer mechanism of claim 11, wherein said synchronizer mechanism is a uni-directional synchronizer apparatus such that said blocker ring projection means includes a radially extending projection having a cam surface adapted to cooperatively engage said angled ends of said first pair of tabs, and wherein said second projection means defines an integral flange shoulder formed on said clutch hub adjacent said guide slot means that is adapted to cooperatively engage said angled ends of said second pair of tabs.

13. The synchronizer mechanism of claim 12, wherein said uni-directional synchronizer mechanism is of the single-cone type such that said first friction surface means is an internal cone surface formed on said blocker ring and said second friction surface means is an external cone surface formed on said gear.

14. The synchronizer mechanism of claim 10, wherein said synchronizer mechanism is a bi-directional synchronizer apparatus including a second gear journally mounted on said shaft adjacent an opposite side of said clutch hub and having an externally splined surface, said clutch sleeve being axially slidable on said clutch hub in a second direction from said neutral position to a second operative position such that upon said clutch sleeve internal spline surface being moved into engagement with said second gear external splines said synchronizer mechanism is operative to couple said second gear for rotation with said shaft, a second blocker ring having third friction surface means and defining a clearance with cooperating fourth friction surface means associated with said second gear, said strut means being movable into engagement with said second blocker ring upon axial shifting operation of said clutch sleeve toward said second gear for energizing said synchronizer mechanism, and wherein said angled ends of said first pair of tabs are adapted to maintain continuous biased engagement with a cam surface of a radially extending projection formed on said first blocker ring and wherein said angled ends of said second pair of tabs are adapted to maintain continuous biased engagement with a cam surface formed on a radially extending projection formed on said second blocker ring.

15. In a gear synchronizer mechanism comprising:
a ratio gear journally mounted on a shaft, said gear having an externally splined surface formed thereon;
an externally splined clutch hub fixed on said shaft intermediate said gear, said clutch hub having a plurality of guide slots formed in the outer circumference thereof;
a blocker ring surrounding said shaft intermediate said ratio gear and said clutch hub and having a first conical friction surface defining a clearance with a cooperating second conical friction surface associated with said ratio gear;
a clutch sleeve encircling said clutch hub and having internal spline teeth in continual meshing engagement with said clutch hub external spline teeth, said clutch sleeve being axially movable such that said clutch sleeve internal spline teeth are adapted to selectively engage said gear externally splined surface;
a plurality of strut members confined within said longitudinally extending guide slots; and
spring means for urging said strut members into engagement with said clutch sleeve internal spline teeth, said strut members adapted to engage said blocker ring during the axial shifting operation of said clutch sleeve to effect frictional engagement of said first and second conical friction surface for developing cone torque therebetween, whereby said synchronizer mechanism is energized for rotating said blocker ring in one direction to an indexed position;
wherein when an index torque developed in said indexed position exceeds said cone torque said blocker ring is rotated in an opposite direction for allowing said clutch sleeve internal splines to pass into lock-up meshed engagement with said gear external splined surface, the improvement wherein said spring means has first surface means for biasing said strut members radially outwardly into contact with said internal spline teeth of said clutch sleeve, and second surface means being maintained in continuous biased engagement with said blocker ring for moving said blocker ring toward a neutral position upon de-energization of said synchronizer mechanism, said second surface means being adapted to continuously exert an axially directed biasing force on said blocker ring which acts to oppose axial movement of said blocker ring toward said ratio gear upon selective movement of said clutch sleeve toward an operative position, and said biasing force being operable to retain said blocker ring in said neutral position for inhibiting self-energization of said synchronizer mechanism due to residual viscous drag between said mating conical friction surfaces.

16. The synchronizer mechanism of claim 15, wherein said spring means is a leaf spring member disposed within said guide slot below said strut member, said first surface means of said leaf spring member defining cambered surface means for radially outwardly biasing said strut members into engagement with a detent groove formed in said clutch sleeve internal spline teeth, and wherein said second surface means of said spring means defines tab means extending from said cambered surface means that is maintained in continuous biased engagement with said blocker ring for continuously exerting said axially directed retracting force thereon whereby movement of said blocker ring toward said first operative position is inhibited.

17. The synchronizer mechanism of claim 16, wherein said tab means include canted surface means acting on projection means formed on said blocker ring, said canted surface means being configured and arranged to continuously exert said retracting force on said projection means with said retracting force being of sufficient magnitude to overcome frictional loading between said blocker ring friction surface and said gear friction surface upon said synchronizer mechanism being de-energized.

18. The synchronizer mechanism of claim 17, wherein said leaf spring is a generally H-shaped member having a pair of longitudinally extending legs separated by a central stem, said legs and stem are slightly convexly curved to define said cambered surface means, said legs being bent down and under said cambered surface means to define first and second pairs of inwardly facing tabs, and wherein said canted surface means include radially outwardly angled ends of said first and second pairs of said tabs, said angled ends of said first pair of tabs adapted to maintain continuous biased engagement with said projection means formed on an external surface of said blocking ring, and said angled ends of said second pair of tabs adapted to maintain continuous biased engagement with second projection means axially aligned with said blocking ring projection means.

19. The synchronizer mechanism of claim 18, wherein said synchronizer mechanism is a uni-directional synchronizer apparatus such that said blocker ring projection means includes a radially extending projection having a cam surface adapted to cooperatively engage said angled ends of said first pair of tabs, and wherein said second projection means defines an integral flange shoulder formed on said clutch hub adjacent said guide slot means that is adapted to cooperatively engage said angled ends of said second pair of tabs.

20. The synchronizer mechanism of claim 19, wherein said uni-directional synchronizer mechanism is of the single-cone type such that said first friction surface means is an internal cone surface formed on said blocker ring and said second friction surface means is an external cone surface formed on said gear.

21. The synchronizer mechanism of claim 18, wherein said synchronizer mechanism is a bi-directional synchronizer apparatus including a second gear journally mounted on said shaft adjacent an opposite side of said clutch hub and having an externally splined surface, said clutch sleeve being axially slidable on said clutch hub in a second direction from said neutral position to a second operative position such that upon said clutch sleeve internal spline surface being moved into engagement with said second gear external splines said synchronizer mechanism is operative to couple said second gear for rotation with said shaft, a second blocker ring having third friction surface means and defining a clearance with cooperating fourth friction surface means associated with said second gear, said strut members being movable into engagement with said second blocker ring upon axial shifting operation of said clutch sleeve toward said second gear for energizing said synchronizer mechanism, and wherein said angled ends of said first pair of tabs are adapted to maintain continuous biased engagement with a cam surface of a radially extending projection formed on said first blocker ring and wherein said angled ends of said second pair of tabs are adapted to maintain continuous biased engagement with a cam surface formed on a radially extending projection formed on said second blocker ring.

* * * * *